United States Patent
Haines

(10) Patent No.: US 10,659,759 B2
(45) Date of Patent: May 19, 2020

(54) SELECTIVE CULLING OF MULTI-DIMENSIONAL DATA SETS

(71) Applicant: Stratus VR, Inc., La Honda, CA (US)

(72) Inventor: Russell T. Haines, La Honda, CA (US)

(73) Assignee: STRATUS SYSTEMS, INC., San Jose, CA (US)

( * ) Notice: Subject to any disclaimer, the term of this patent is extended or adjusted under 35 U.S.C. 154(b) by 6 days.

(21) Appl. No.: 15/690,123

(22) Filed: Aug. 29, 2017

(65) Prior Publication Data
US 2018/0063504 A1    Mar. 1, 2018

Related U.S. Application Data

(60) Provisional application No. 62/380,914, filed on Aug. 29, 2016.

(51) Int. Cl.

| | |
|---|---|
| *H04N 1/16* | (2006.01) |
| *H04N 13/167* | (2018.01) |
| *H04N 13/194* | (2018.01) |
| *H04N 13/178* | (2018.01) |
| *H04N 13/344* | (2018.01) |
| *H04N 13/383* | (2018.01) |
| *H04N 13/156* | (2018.01) |
| *H04N 7/18* | (2006.01) |
| *H04N 5/60* | (2006.01) |

(52) U.S. Cl.
CPC .......... *H04N 13/167* (2018.05); *H04N 7/183* (2013.01); *H04N 13/156* (2018.05); *H04N 13/178* (2018.05); *H04N 13/194* (2018.05); *H04N 13/344* (2018.05); *H04N 13/383* (2018.05); *H04N 5/60* (2013.01)

(58) Field of Classification Search
CPC .... H04N 13/156; H04N 7/183; H04N 13/178; H04N 13/194; H04N 13/383; H04N 13/344; H04N 13/167
See application file for complete search history.

(56) References Cited

U.S. PATENT DOCUMENTS

| | | | |
|---|---|---|---|
| 6,530,887 B1 | 3/2003 | Gilbert et al. | |
| 7,542,090 B1 * | 6/2009 | Merchant | G02B 27/58 348/335 |
| 8,539,359 B2 * | 9/2013 | Rapaport | G06Q 10/10 715/751 |
| 9,589,372 B1 * | 3/2017 | Bean | G06T 3/20 |
| 9,756,294 B2 | 9/2017 | Saptharishi | |
| 9,838,687 B1 * | 12/2017 | Banta | H04N 19/00903 |

(Continued)

FOREIGN PATENT DOCUMENTS

WO    WO-2018044917 A1    3/2018

OTHER PUBLICATIONS

PCT/US2017/049167 International Search Report and Written Opinion dated Nov. 6, 2017.

(Continued)

*Primary Examiner* — Neil R Mikeska
(74) *Attorney, Agent, or Firm* — Wilson, Sonsini, Goodrich & Rosati

(57) ABSTRACT

Method and system for selective culling of multi-dimensional data sets. Selective culling system introduces a feedback control method for remote users (e.g., client-side) to customize the selection, transmission, and display of datasets (e.g., on server-side) or any collection or subset of datasets.

26 Claims, 7 Drawing Sheets

(56) References Cited

U.S. PATENT DOCUMENTS

| | | | |
|---|---|---|---|
| 9,992,449 B1 | 6/2018 | Ashkenazi et al. | |
| 2002/0064314 A1* | 5/2002 | Comaniciu | G06T 9/001 |
| | | | 382/239 |
| 2010/0246669 A1 | 9/2010 | Harel | |
| 2013/0050260 A1 | 2/2013 | Reitan | |
| 2013/0127980 A1* | 5/2013 | Haddick | G06F 3/013 |
| | | | 348/14.08 |
| 2013/0293577 A1 | 11/2013 | Perez et al. | |
| 2014/0361957 A1 | 12/2014 | Hua et al. | |
| 2015/0279418 A1* | 10/2015 | Laksono | G11B 20/10527 |
| | | | 386/248 |
| 2015/0324636 A1 | 11/2015 | Bentley et al. | |
| 2016/0219241 A1* | 7/2016 | Korneliussen | H04N 7/0127 |
| 2016/0227161 A1* | 8/2016 | Jing | H04L 12/1822 |
| 2017/0123492 A1* | 5/2017 | Marggraff | G06F 3/0236 |
| 2017/0311035 A1* | 10/2017 | Lewis | G06F 16/735 |
| 2018/0101611 A1* | 4/2018 | McDevitt | G06N 5/027 |
| 2018/0157915 A1* | 6/2018 | Sherry | G06K 9/00771 |
| 2018/0349708 A1* | 12/2018 | van Hoof | G06K 9/00771 |

OTHER PUBLICATIONS

Smith, J. Salient Systems evaluation. Drafted on Oct. 9, 2019 for internal use.

* cited by examiner

SELECTIVE CULLING OF MULTI-DIMENSIONAL DATA SETS

CROSS-REFERENCE

This application claims priority to U.S. Provisional Application No. 62/380,914 filed on Aug. 29, 2016, which is entirely incorporated herein by reference.

BACKGROUND

The amount of data acquired and stored is rapidly increasing. Network bandwidth, however, may be limited, relative to the acquired data that needs to be transmitted across the network. For immersive, virtual reality (VR) and augmented reality (AR) enabled systems, such bandwidth issues are further exacerbated due to larger acquired data sets, and existing solutions may lack the flexibility required to deal with multiple types of data input sources (e.g., image, video, audio, sensor input), or may lack full capability to transmit exponentially larger datasets. Not all acquired data, however, may be valuable to or perceivable by the user. Consequently, users of VR/AR systems may desire more flexibility in customizing and selecting the type—and the specific subset—of data input that may be useful and valuable to the user.

SUMMARY

Accordingly, there exists a need for systems, methods, and techniques for a user, or group of users, to perceive only what they need or choose, while maintaining the fidelity of all acquired data. The present invention provides various embodiments of methods and systems for selectively culling data for various user interface systems and display systems, including immersive display systems.

Selective culling introduces a feedback control method for remote users (e.g., client-side) to customize the selection (e.g., on server-side), transmission, and display of datasets or any collection or subset of datasets. For example, when applied to images or videos, instead of compressing or discarding images at the source to deal with limited bandwidth problems, the systems and methods introduced herein can help maintain the fidelity of the image or data captured at the source, while maximizing the viewing experience for any given bandwidth—i.e., bandwidth limited environment—by leveraging the inherent limitation in the extent of the observable world that is seen at any given moment by the human eye. For example, the systems and methods described herein do not require discarding or removing obtained videos or images, or compressing images to undesirable levels.

In an aspect, disclosed herein is a computer-implemented method for selectively culling data sets at data source for a viewer of a display system. The method may comprise: determining a control command based at least on requested data sets, field of interest of the viewer, and available bandwidth; receiving, at a server, the control command, wherein the control command comprises encoding of instructions on which one or more subsets among the data sets are to be culled; selectively culling, at the server, one or more subsets among the requested data sets according to the transmitted control command; and serving, to the display system, the selectively culled data set.

The data sets may comprise video and audio content. In some embodiments, the data sets may further comprise sensor data.

The control command can be further based at least on display system information, wherein the display system information includes display type, display resolution, display size, display frame rate, and distance from the user to the display system.

In some embodiments, the control command can be further based at least on metatags and metadata embedded or associated with the requested data sets. Other features of the requested data sets can be the basis for the control command.

In some embodiments, the size of the control command can be 128 bytes or less. The size of the control command can be 100 bytes or less. In some embodiments, the size of the control command can be 256 bytes or less.

In some embodiments, video and audio content may comprise two-dimensional, three-dimensional, or virtual reality video and audio content.

In some embodiments, the control command information can be further based at least on foveal area and foveal area target shape.

In some embodiments, the display system can be an immersive display system. The immersive display system can be a head-mounted display (HMD) system.

The field of interest information can be obtained by monitoring one or more sensors local to the viewer. In some embodiments, the field of interest information can be further adjusted based on user input methods, wherein the user input methods comprise joystick, touch display, and keyboard. In some embodiments, the field of interest information can be further adjusted based on a class of input methods comprising knobs, fader, and buttons.

In some embodiments, the one or more sensors can be configured to track body movement, head movement, and eye movement of the viewer. The one or more sensors can be further configured to track stereo view information for each eye of the viewer.

In some embodiments, the X, Y, and Z coordinate information of the eye, head, and body movements can be tracked. In some embodiments, the one or more sensors can be configured to track the movements over time, thereby calculating acceleration and interpolation of the field of interest.

In some embodiments, the one or more subsets that are within the viewer's field of interest can be selectively culled.

In some embodiments, the amount of culling can be configured to be proportional to the available or desired bandwidth between the server and the display system.

In another aspect, disclosed herein is a system for selectively culling data sets at a data source for viewers of immersive display systems. The system may comprise: an immersive display system comprising sensor modules; a processor that is communicatively coupled to a server system and adapted to execute stored instructions; and a memory device, communicatively coupled to the processor, wherein the memory device is configured to: determine a control command based at least on requested data sets, field of interest of the viewer, and available bandwidth; receive, at the server system, the control command, wherein the control command comprises encoding of instructions on which one or more subsets among the data sets are to be culled; selectively cull, at the server system, one or more subsets among the requested data sets according to the transmitted control command; and serve, to the display system, the selectively culled data set.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various apparent respects, all without departing from the disclosure. Accordingly, the drawings and descriptions are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein) of which:

DETAILED DESCRIPTION

Described herein are systems, methods, and techniques that can be used to dynamically select useful and pertinent information in order to transmit data in a bandwidth limited environment. Selective culling control method takes full advantage of the fact that the amount of data acquired in immersive environments greatly exceeds human perception capacity. The selective culling feedback control method and system may be applied in combination with, or in addition to, other data compression and encoding methods. Selective culling may lighten the computation burden on the client-side (e.g., display viewer), and instead, shift the computational load to the server—either on-premises or cloud-based servers. For a given data rate and compression rate, the selective culling control method may provide highly customizable and useful information to the user.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Selective Culling System Overview

Figure 1:
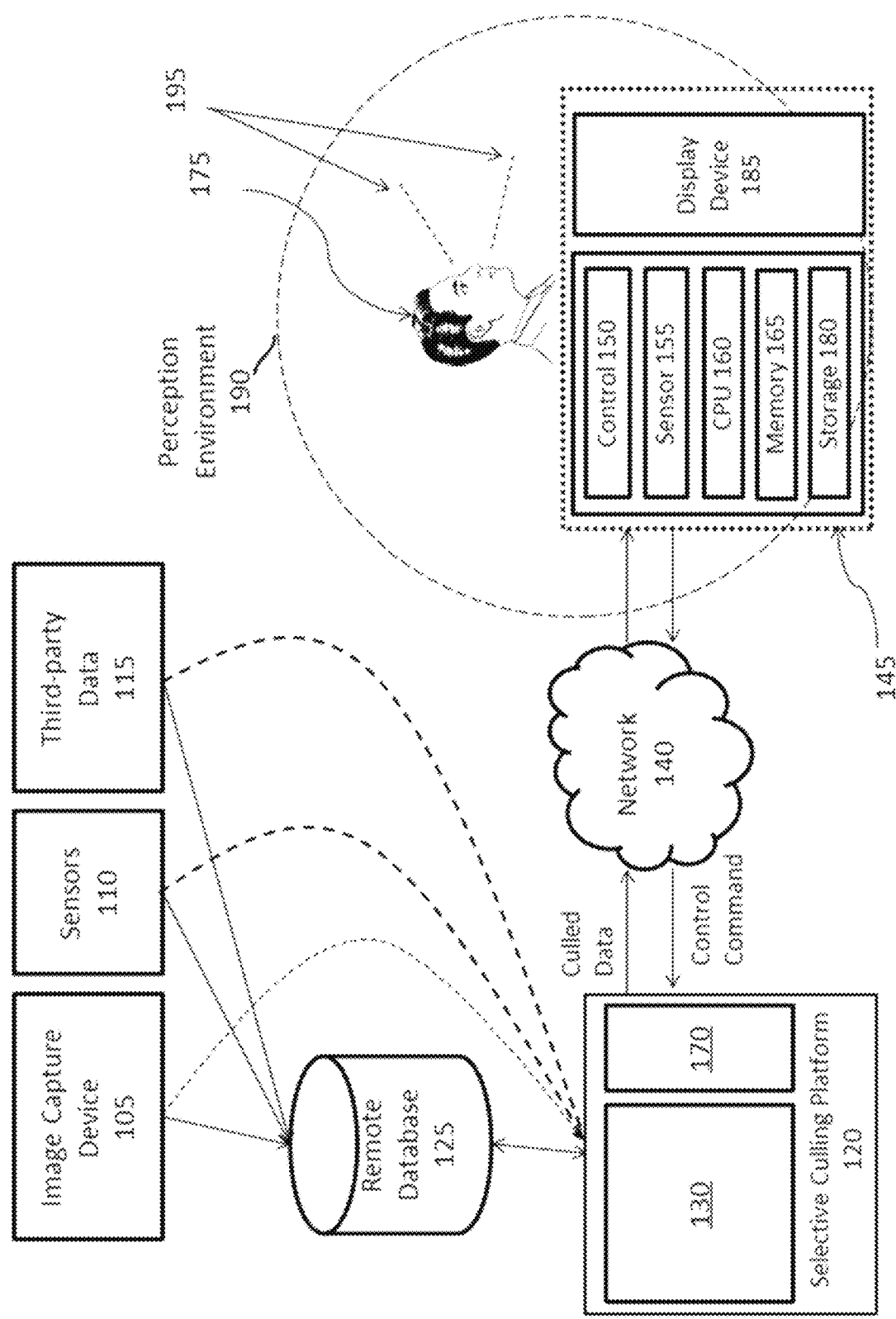
FIG. 1 illustrates an exemplary environment in which the selective culling concepts described herein may be implemented.

FIG. 1 illustrates an exemplary environment in which the selective culling concepts described herein may be implemented. The environment may comprise a selective culling platform 120, one or more remote databases 125, one or more input data sources 105-115 capable of communicating with the platform to transmit/receive data, a communication network 140, a client terminal 145, communicatively coupled to the platform 120, e.g., by a network 140. In some embodiments, a client terminal 145 may be controlled by the user 175, who may be located within a perception environment 190.

The user's perception environment 190 may generally refer to a region or area within a certain distance from the user, for example, 0.1 meter, 0.2 meter, 0.3 meter, 0.4 meter, 0.5 meter, 1 meter, 2 meters, 3 meters, 4 meters, 5 meters, 10 meters, 15 meters, 30 meters, 50 meters, 100 meters, or any other distance which is a fraction or a multiple of the above, wherein the user may view the transmitted data. The perception environment 190 may also refer to the space or region where the transmitted information (e.g., data sets) may be displayed, for example, on a projector screen. The perception environment 190 may also comprise multiple display units behaving as a unified display system. In some embodiments, the perception environment 190 may also refer to one or more types of head-mounted display (HMD) systems such as, for example, an Oculus Rift or a Samsung Gear. In other embodiments, the perception environment 190 may be a "fulldome", which may refer to immersive dome-based video projection environments. The dome may be filled with real-time or pre-rendered images or videos. Depending on the type of perception environment, the client-side may or may not require a separate display device 185.

The data input sources may include image capture devices 105, sensors 110, or third-party data 115. Data input sources may include one or more types of image capture devices 105. In some embodiments the image capture device 105 may be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The 360-degree cameras may be able to capture an immersive 360-degree view of the environment. The camera may comprise optical elements (e.g., lens, mirrors, filters, etc). The camera may capture color images, greyscale image, infrared images, and the like. The camera may be a thermal imaging device when it is configured to capture infrared images.

Data input sources may include one or more types of sensors 110. Some examples of sensors may include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, and/or gravity detection sensors), altitude sensors, attitude sensors (e.g., compasses), pressure sensors (e.g., barometers), temperature sensors, humidity sensors, vibration sensors, audio sensors (e.g., microphones), and/or field sensors (e.g., magnetometers, electromagnetic sensors, radio sensors).

Third-party data sources may, for example, include videos stored or playable at YouTube.com, Netflix.com, Hulu.com, Vimeo.com, as well as any other types of data accessible on the Internet or on a cloud-based storage. For example, one or more third-party data sources may be an online video streaming service. Third-party data sources may or may not be real-time data. In some embodiments, real-time or near real-time videos may be transmitted and processed at the selective culling platform 120. Third-party data sources may also be stored at one or more remote databases 125 for later processing.

The selective culling platform 120 may include a data processing device, system, or module 130, and server software 170. Data processing device 130 can comprise one or more of CPU, memory, storage, and other components. The CPU, memory, storage, and other components can be similar to those comprising the client terminal 145, including the CPU 160, memory 165, storage 180, which are also described herein. In one embodiment, the selective culling platform 120 may operate on high performance server class computers. The details of the hardware aspects of such servers are well known to those of skill in the art and are not further described herein. The selective culling platform 120 in FIG. 1 is illustrated as a single computer system; however, servers for the platform 120 may be implemented as a network of computer processors and associated storage devices. For example, server devices may include servers, mainframe computers, networked computers, a processor-based device, and similar types of systems and devices. The selective culling platform 120 and its associated storage devices (e.g., remote databases 125) need not be physically co-located, and there need not be any predefined mapping between storage devices and server computers. The remote database 125 may store data collected from one or more input sources 105, 110, 115, and the data processing device 130 may be communicatively coupled to the remote database 125. The server software 170 may include a number of executable code portions and data files, and these include code for enabling the selective culling of data sets or other functions or methods described herein. "Remote database" as used herein, does not necessarily indicate that the database is located at a distinct, remote location. The remote database 125 may be co-located with the client terminal or the server, but may be operated separately from a client terminal or the server.

The client terminal 145 can be any type of client computing device, and may be programmed to implement one or more methods of the present disclosure. In some embodiments, the client terminal 145 and the selective culling platform 120 may form a client-server relationship. One or more of the functionality of either the selective culling platform 120 or the client terminal 145 described herein can be implemented on either of the selective culling platform 120 or the client terminal 145. The client terminal 145 may comprise a central processing unit (CPU, also "processor" and "computer processor" herein) 160, which can be a single core or multi core processor, or a plurality of processors for parallel processing. The client terminal 145 also includes memory or memory location (e.g., random-access memory, read-only memory, flash memory) 165, electronic storage unit (e.g., hard disk) 180, communication interface (e.g., network adapter) for communicating with one or more other systems, and peripheral devices, such as cache, other memory, data storage and/or electronic display adapters. The memory, storage unit, interface and peripheral devices are in communication with the CPU 160 through a communication bus (solid lines), such as a motherboard. The storage unit 180 can be a data storage unit (or data repository) for storing data. The client terminal 145 can be operatively coupled to a computer network ("network") 140 with the aid of the communication interface.

The network 140 may be a communication pathway between the selective culling platform 120, remote database, image capture device 105, sensors 110, third-party data base 115, and the client terminal 145. The network 140 may comprise any combination of local area and/or wide area networks using both wireless and/or wired communication systems. For example, the network 140 may include the Internet, as well as mobile telephone networks. In one embodiment, the network 140 uses standard communications technologies and/or protocols. Hence, the network 140 may include links using technologies such as Ethernet, 802.11, worldwide interoperability for microwave access (WiMAX), 2G/3G/4G/5G mobile communications protocols (or any other communication protocols that can be an improvement or extension upon the currently available mobile communication protocol), asynchronous transfer mode (ATM), InfiniBand, PCI Express Advanced Switching, etc. Other networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), real time streaming protocol (RTSP), and the like. The data exchanged over the network can be represented using technologies and/or formats including image data in binary form (e.g., Portable Networks Graphics (PNG)), the hypertext markup language (HTML), video formats, the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above.

The CPU 160 can execute a sequence of machine-readable instructions, which can be embodied in a program or software. The instructions may be stored in a memory location, such as the memory 165. The instructions can be directed to the CPU 160, which can subsequently program or otherwise configure the CPU 160 to implement methods of the present disclosure. Examples of operations performed by the CPU 160 can include fetch, decode, execute, and writeback. The CPU 160 can be part of a circuit, such as an integrated circuit. One or more other components of the system 160 can be included in the circuit. In some cases, the circuit is an application specific integrated circuit (ASIC).

The storage unit 180 can store files, such as drivers, libraries and saved programs. The storage unit can store user data, e.g., user preferences and user programs. The client terminal 145 in some cases can include one or more additional data storage units that are external to the client terminal, such as located on a remote server that is in communication with the client terminal 145 through an intranet or the Internet.

The client terminal 145 can communicate with one or more remote computer systems through the network 140. For instance, the client terminal 145 can communicate with a remote computer system of a user or other immersive display devices (e.g., HMD) 185. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), personal digital assistants, Oculus Rift, HTC Vive, or other VR/AR systems. The user can access the client terminal 145 via the network 140.

Methods as described herein can be implemented by way of machine (e.g., computer processor) executable code stored on an electronic storage location of the client terminal 145, such as, for example, on the memory 165 or electronic storage unit 180. The machine executable or machine readable code can be provided in the form of software. During use, the code can be executed by the processor 160. In some cases, the code can be retrieved from the storage unit and stored on the memory 165 for ready access by the processor 160. In some situations, the electronic storage unit can be precluded, and machine-executable instructions are stored on memory 165.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the client terminal 145, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing data or instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The client terminal 145 may include or be in communication with an electronic display device 185 that comprises a user interface (UI) for providing, for example, displaying the selectively culled dataset, selection of types of datasets to be displayed, feedback control command configuration tools, any other features related to the selection, transmission, and display of datasets, or any other features described herein. For example, the UI may be configured to enable the user to choose one or more inputs for the control command, among the plurality of inputs that can be used with the feedback control command. In some embodiments, the display device 185 may include a head-mounted display (HMD), or a pair of virtual reality (VR) or augmented reality (AR) enabled glasses. The display device 185 might not be a part of the client terminal 145 and may be communicatively coupled to the client terminal 145 to receive the culled and processed data. For example, the display devices 185 may be a projection system (e.g., immersive display system).

In some instances, the display device 185 may comprise a mobile device (e.g., mobile phone) mounted onto a foldable headgear. The mobile device may comprise a graphical display configured to display a first-person-view (FPV) of the environment. In such configuration, the mobile device may also function as a client terminal 145, and may be communicatively coupled to the network to receive the culled data. The sensor module may also be fully integrated into the mobile device.

In some embodiments the client terminal may include a control module 150 and a central processing unit (CPU) (160). The control module may communicate with the server (i.e., selective culling platform) 120 via the communication network 140 to transmit control command codes or instruction sets. The control command codes may determine the type of data or the subset of data to be transmitted over to the client terminal 145 from the server 120. For example, the control command codes may be configured to instruct the server to communicate with the remote database to retrieve one or more data set of interest. In some embodiments, the control module may be configured to communicate with the CPU 160 to process the data that is transmitted over from the server 120 to the client terminal 145.

The client terminal 145 may include a sensor module 155. The sensor module 155 may or may not be part of the client terminal 145. The sensor module 155 may be configured to be communicatively coupled to the client terminal 145. For example, the sensor module 155 may be connected to the client terminal 145 via one or more wireless methods, peer-to-peer methods, or a wired method such as a connection via USB. The sensor module 155 may be configured to detect and collect relevant information related to the user's perception environment 190. In one embodiment, the sensor module 155 may be configured to collect information regarding the user's perception environment 190, including the user's movement and orientation in a virtual reality (VR) environment. For example, the user may be facing a given direction and the user's visual field of view (FOV) may be bounded by the two dotted lines illustrated in 195, and the sensor module 155 may be configured to detect all relevant information regarding the user and his or her perception environment 190, including the user's foveal area. The sensor module may be in communication with the processor 160 and be configured to enable predictive interpolation of the user's motion and behavior with regard to the FOV. In other embodiments, the display device (e.g., HMDs) may include a sensor module that may be able to detect the user's specific motion, and track, for instance, eye movements.

The sensor module 155 may track eye movements by measuring the point of gaze (i.e., where a user may be looking) or the motion of an eye relative to the head. The sensor module 155 may comprise an eye tracking device for measuring such eye positions and/or eye movements. Various types of eye tracking devices may be combined.

While only a single client terminal 145 is shown, the system can support a large number of concurrent sessions with one or more clients 145. For example, the selective culling platform 120 may be communicatively coupled to two or more client terminals 145 or multiple display devices 185.

Selective Culling Feedback Control System

Figure 2:
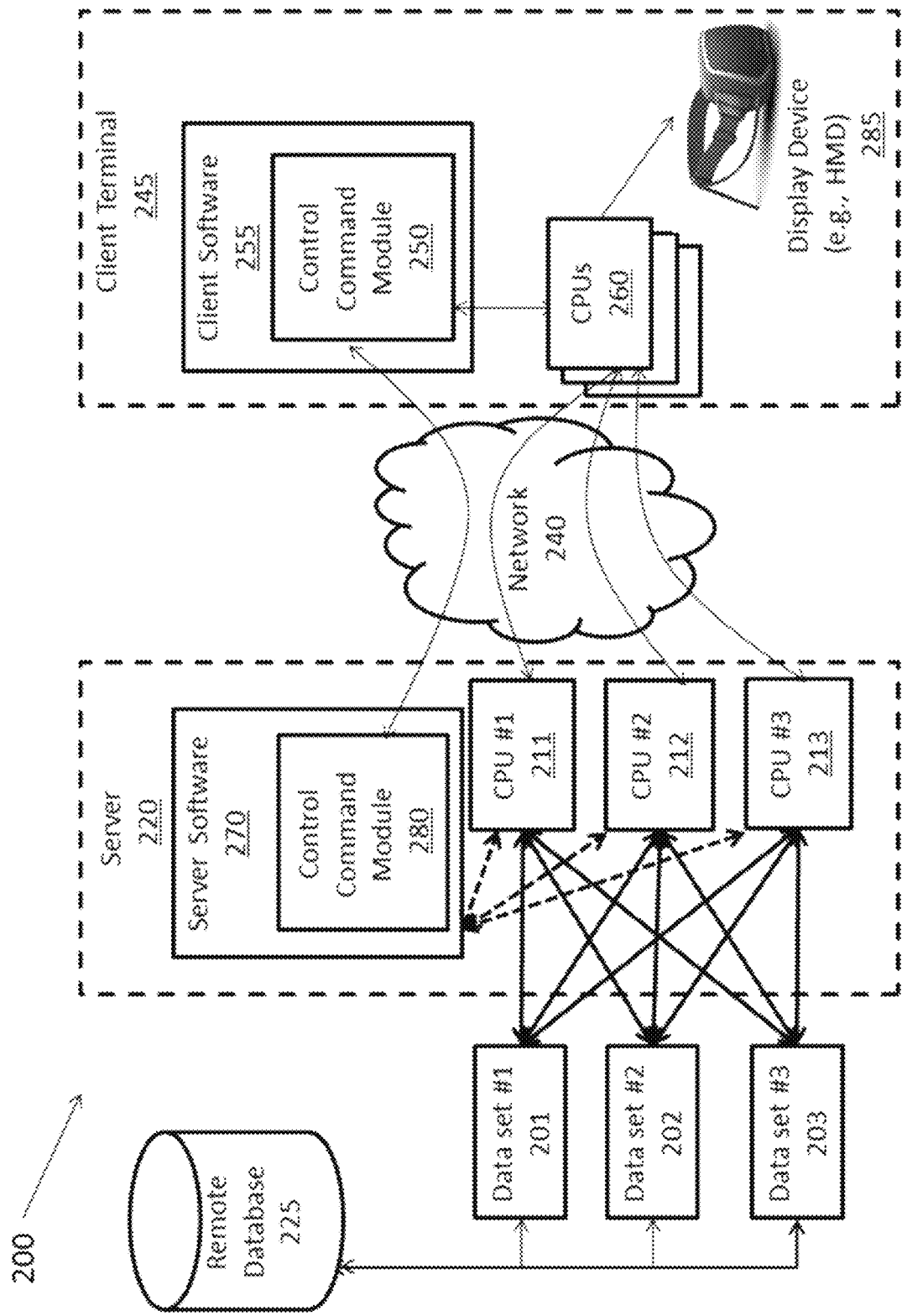
FIG. 2 illustrates an exemplary block diagram for the selective culling feedback control system in accordance with an embodiment described herein.

FIG. 2 illustrates an exemplary block diagram for a selective culling feedback control in accordance with one embodiment described herein. In one embodiment, the feedback control system 200 may include a server 220 (i.e., selective culling platform 120), a remote database 225, and a client terminal 245. The client terminal 245 may include client software 255—which includes a client control command module 250—client-side processors 260, and a display device 285, which may or may not be part of the client terminal 245. The server 220 may or may not include the server software 270, which may or may not include the local control command module 280. The control command module 280 may be in communication with one or more processors, such as the server CPUs 211-213. The CPUs 211-213 (i.e., CPU #1 211, CPU #2 212, CPU #3, 213) may process one or more distinct types of data sets 201-203, which may represent one or more data sets stored in the remote database 225. As described above, the remote database 225 may or may not be co-located with the server, and may be communicatively coupled to the server 220. After the data sets are processed by the CPUs 211-213, the culled data sets may be transmitted to client terminal 245, via the communications network 240.

In one embodiment, for example, three distinct data sets—Data set #1 (201), Data Set #2 (202), Data Set #3 (203)—may be retrieved from the remote database 225.

Referring to FIG. 2, the three processors CPU #1 (211), CPU #2 (212), and CPU #3 (213)—may respectively represent three distinct processors, or may represent—or be part of—one or more multi-core processors. Here, the processor modules may be configured to receive any one or more of the data sets as inputs, according to the control commands set by the local control command module 280. The server-side control command module 280 may be in communication with the client control command module 250, via the communications network 240. Both control command modules 250, 280 may be configured to generate and interpret control command codes for the selective culling method. In some embodiments, the control command codes may specify how and when the data sets 201-203 are to be processed. For example, the control command may direct CPU #1 (211) to receive data set #1 (201) as input to apply selective culling, and the output may be referred to as culled data set #1; the control command may direct CPU #2 to receive data set #2 (202) as input and apply selective culling, and the output may be referred to as culled data set #2; the control command may also direct CPU #3 to take data set #3 (203) as input to apply selective culling, and the output may be referred to as culled data set #3. The output data—culled data set #1, culled data set #2, and culled data set #3—may be transmitted to the client terminal, and the transmission timing of the respective data set may be independently controlled by the server-side control command module 280. For example, culled data set #1 may have priority over culled data set #2. In such case, the control command may be configured to transmit culled data set #1 to the client terminal via the network 240, deprecating the transmission of culled data set #2. The transmission of one or more types of data sets may be pipelined, according to the bandwidth requirements and the priority or importance of the data sets to be transmitted.

Alternatively, input data sets may be combined or processed by one or more CPUs, and multiple different combinations of data sets and processors may exist, as illustrated in FIG. 2. Essentially, there need not be any predefined mapping between data sets and server processors.

In some embodiments the client control command module 250 may be directly in communication with the processor modules 211-213.

The selective culling feedback control command codes may be implemented as Boolean, radio button, integer, or floating point variables signed or unsigned or as alphanumeric variables. The codes may be implemented as 1-bit, 2-bit, 3-bit, 4-bit, 8-bit, 16-bit, 24-bit codes and the like, or may be implemented by other encoding methods.

The feedback control command may use, but are not limited to, TCP/IP protocol, or other serial or parallel transmission methods, which may minimize bandwidth requirements for transmitting control command codes or instruction sets.

One skilled in the art will recognize that the system architecture illustrated in FIGS. 1 and 2 is merely exemplary, and that the embodiments described herein may be practiced and implemented using many other architectures and environments, and may include additional components not illustrated in the figures.

Selective Culling of Dataset

Figure 3:
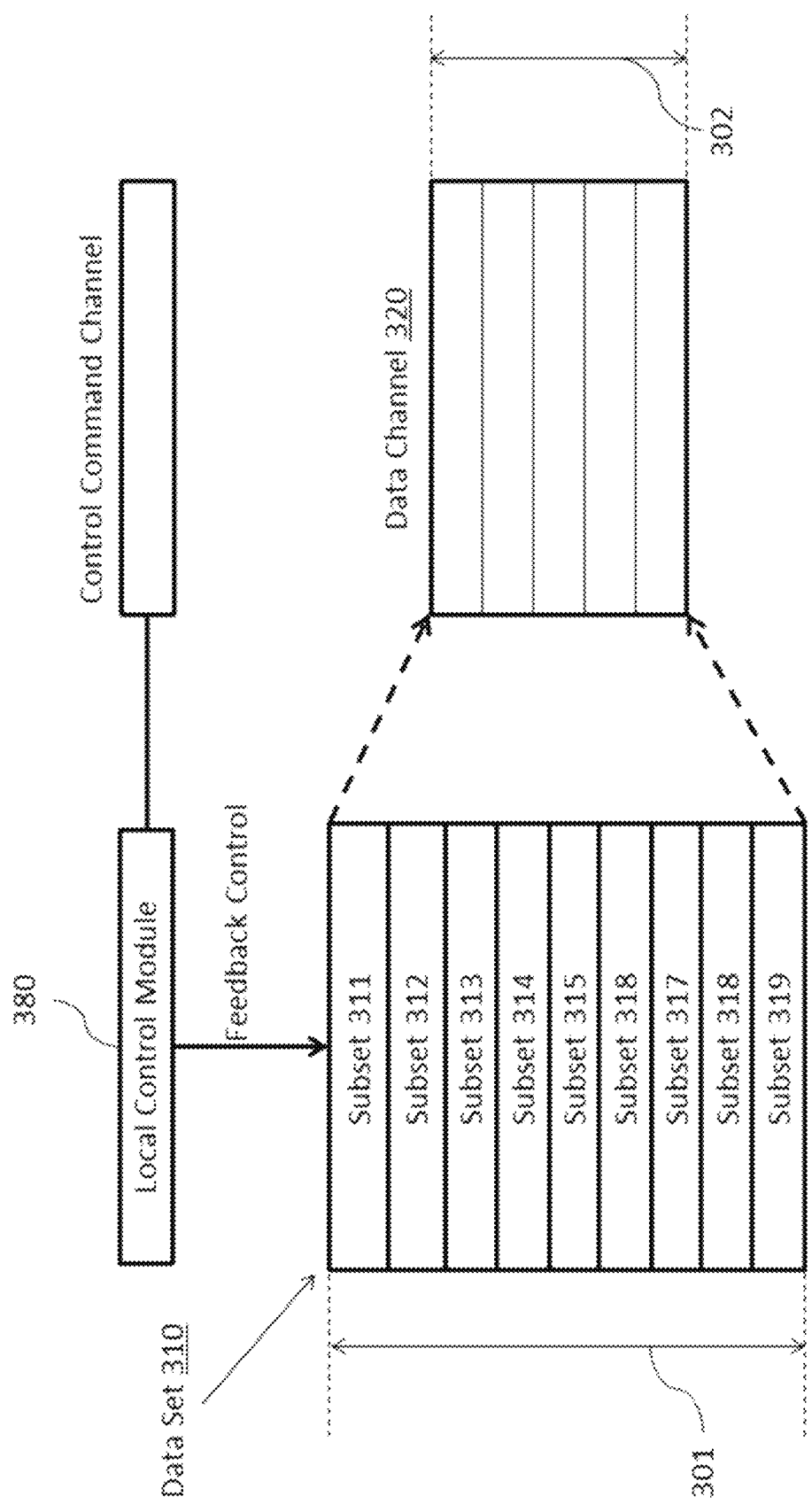
FIG. 3 shows an exemplary illustration of the selective culling control command applied to a dataset in accordance with some embodiments described herein.

FIG. 3 shows an exemplary illustration of the selective culling control system applied to a dataset in accordance with one embodiment described herein. The height of the depicted data set FIG. 310 (represented by 301) may represent the total bandwidth of the acquired data. The height of the data channel FIG. 320 (represented by 302) may represent the available bandwidth for data transmission in a given communication network. As mentioned above, the embodiments described herein operate within a bandwidth limited context, which is also reflected by the difference in the size of the data set and the data channel (i.e., communication network). Selective culling methods may enable the remote client (or the user) to customize the selection—either manually or automatically, or in combination of both—of the subset of data to be transmitted across the data channel 320 (e.g., communication channel or network 240).

Here, the data set 310 is further divided into one or more data subsets. For example, as illustrated in FIG. 3, the data set 310 may be divided into 9 distinct data subsets, depending on the data type. Subsets 311-319 may each represent distinct types of data sets that may be of potential interest to the remote client (e.g., user or viewer). The local control module 380 (e.g., server control command module 280) may be configured to send control command codes (i.e., instruction sets) to select the one or more subset of data sets—among the subsets 311-319—that are within the field of view (FOV) or the field of interest (FOI) of the user. For example, the feedback control command may include instructions to select five (5) subsets—311, 313, 315, 317, and 319—to transmit over the data channel. The five subsets may, for example, contain the images or video segments that are in the FOV of the user. The FOI may be distinct from the FOV, depending on whether the user may be interested in viewing an object or an area that lies beyond the user's foveal area or the user's given FOV. In some embodiments, the FOI may be within a given FOV.

The selective culling control method may specify what instructions may or may not be included in the selective culling feedback commands. In one embodiment, the client may be in a virtual reality (VR) environment, using the HMD as a display device 285. The HMD may or may not be communicatively coupled to a client terminal (e.g., a personal computer). For such environments, the VR/AR systems may include the following categories of control commands, which may be customizable by the user. One or more of the following control commands may be automatically detected by the sensor or sensor modules (e.g., FIG. 1 sensors 155):

Field of View Information:
    X, Y, Z coordinates of the field of view ("FOV") tracking, which may include the X, Y, Z coordinates of the eye, head, and/or the body, and all translations, rotations, and scaling of the variables
    Stereo view information for each eye: right eye [x, y, z], left eye [x, y, z]

Temporal Information
    Current time pointer
    Scroll backwards at 10% of total recorded event
    Scroll backwards at 1% of total recorded event
    Play real-time at current time pointed location
    Scroll forwards at 1% of total recorded event
    Scroll forwards at 10% of total recorded event
    Play at real-time live pointer Spatial Information
    Display type
    Display resolution
    Display size
    Display frame rate
    Distance to the display system
    Display as percentage (%) of the FOV of the user Data Culling Information
    Z-plane depth offset
    Foveal size
    Foveal area target shape (e.g., circle, rhomboid, other geometric shapes)
    Falloff from foveal to Z-plane
    Max data rate allowed Calculated $2^{nd}$ order variables
    Z-depth FOI from parallax of left eye and right eye difference
    Predictive FOI location based on X, Y, and Z information over time creating speed, acceleration, and interpolation of movement. Predictive FOI location may be used to predict the FOV of the user.
    Inter-frame rendering requirements based on speed of playback and predictive FOI location.

The FOV or the FOI of the VR viewer may be determined based upon a variable (e.g., foveal area) or a set of variables (e.g., bandwidth, screen resolution, display size, distance to the display system) which may be configured according to the feedback control command codes or instructions. The categories and variables listed above may be further categorized into manual control command inputs or automatically adjusted control commands.

Figures 4A, 4B:
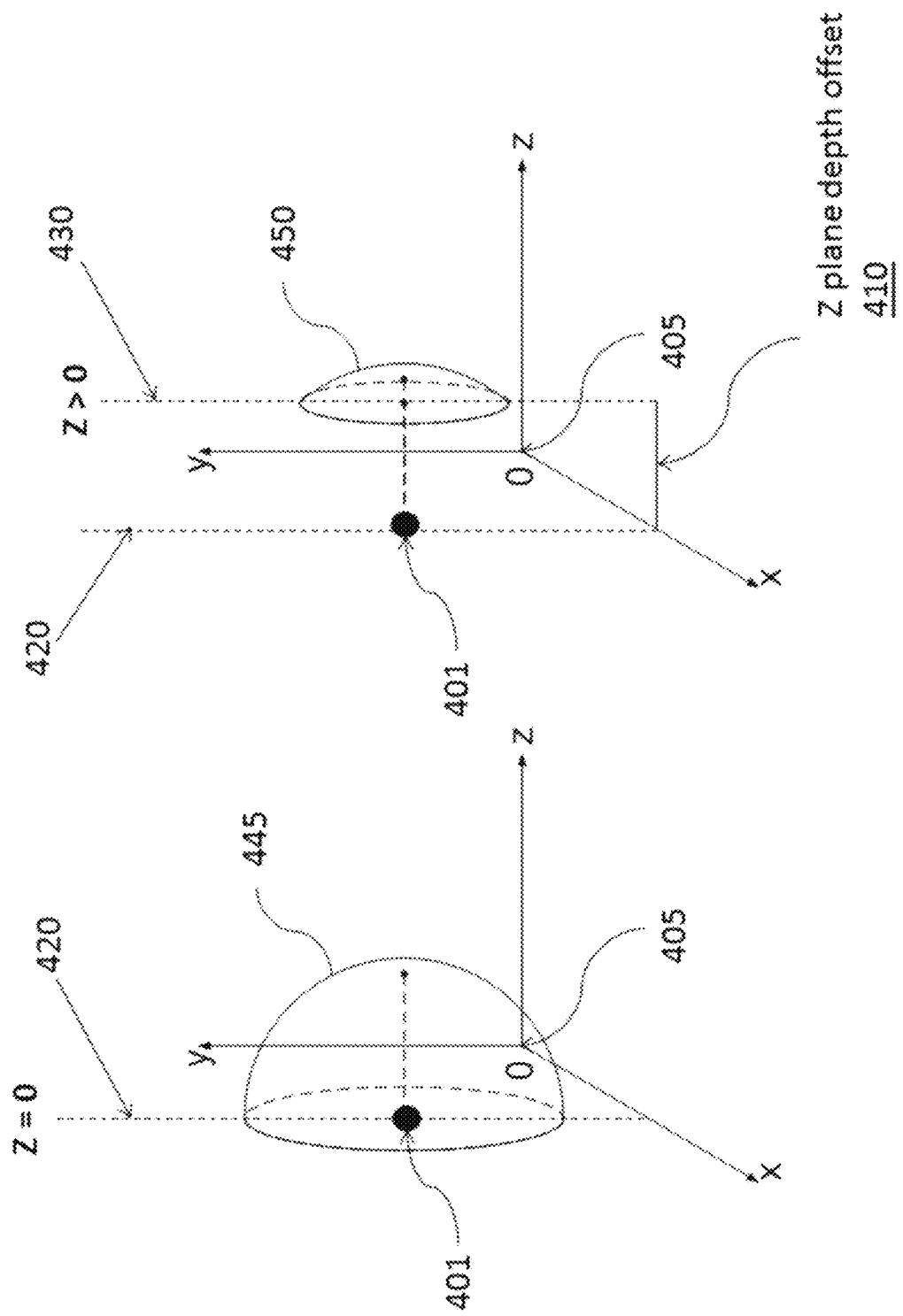
FIG. 4A-4B shows an exemplary illustration of the selective culling methods applied to a user of a VR system in a three-dimensional environment.

FIGS. 4A-4B show exemplary illustrations of the selective culling concepts applied to a user of a VR system in a three-dimensional environment. FIG. 4A shows a hemisphere 445 located in a xyz-space. A spherical coordinate system may also specify any position of a point, either on or beyond the surface of the hemisphere. The three numbers for the spherical coordinate system—the radial distance (rho) from a fixed origin 405, its polar angle (theta) measured from a fixed zenith direction, and the azimuth angle (phi) of its orthogonal projection on a reference plane that passes through the origin and is orthogonal to the zenith, measured from a fixed reference direction on that plane—may specify a specific point on the hemisphere. Referring to FIG. 4A, the user (e.g., the viewer of the VR images) may be located on the x-y place at z=0 (e.g., point 401), and may be facing the positive-z axis direction, which means that all data located in the negative-z three-dimensional space is facing away from the viewer (401). For such a viewer, his or her FOV may only include the spatial region in the positive z-direction of x-y plane at z=0.

In some embodiments, the control commands are configured such that the FOI is defined by the viewer's direction or the focal view point, and only the data that resides in the positive-z space is transmitted to the user (e.g., client terminal 245); any data that resides in the negative-z space is selectively culled (i.e., culled) and is not transmitted over to the client terminal. For example, applying the selective culling control command to the VR system described herein, the server may only be required to transmit half (50%) of the data that is collected from the various data input sources. The FOV may be adjusted and shifted based on the needs of the user.

In other embodiments, the user may customize the shape of the FOV area that is displayed at the client terminal. Referring to FIGS. 4A-B, the FOV may be shaped in a circular shape. The shape of this FOV area may be customized and may be represented by any other type of geometrical shape such as, for example, a triangle, square, rhombus, etc.

FIG. 4B shows an illustration of the system described in FIG. 4A, with the additional z-plane depth offset set at a positive, non-zero value (shown by 410, which is also the difference in the z-value of 430 and 420). As described herein, feedback control commands may include configurable variables that enable the user to increase or decrease the z-plane depth offset according to, for example, the available bandwidth for data transmission. Some VR system may only have—due to bandwidth limitations—capacity for less than, for example, 5%, 10%, 15%, 20%, 30%, 40%, 50%, 60%, 70%, 80%, 90% and the like, of the total data acquired by the server 120 to be transmitted over to the client terminal for display. By adjusting the z-plane depth offset, the user may only transmit data that resides in the spatial region in the positive-z direction of the x-y plane located at 430. In other words, all data that resides in the negative-z direction of the x-y plane—the plane of which line 430 is a subset—may be removed from the list of data sets to be transmitted across the data channel. In some embodiments, the feedback control commands may be customized by the remote user, via the client control command module 250.

Alternatively, the control commands may be configured to be automatically updated based on the available bandwidth, the total size of data to be transmitted, or the display systems in use. For example, by detecting the specifications of the display device and the viewer's relative positioning to it (e.g., FOV, distance, and size of the display), the server 220 may be configured to apply optimal control commands to immediately cull unnecessary data.

In some embodiments, the data sets may include multi-channel videos, which may or may not require further levels and types of control commands. For example, data sets for graphics rendering may include vertices, polygons, shading information, bitmapping, in which case control commands may be utilized to enhance rendering speed or lower bandwidth usage. For such data sets, for example, the control command codes or instruction sets may include, manual controls that require user inputs such as, 1) shading type (e.g., wireframe, flat, etc.), 2) geometry type (e.g., polygonal, Non-uniform rational B-spline (NURBS), triangle strip, etc.), or 3) user's level of detail (LOD) requirements. The LOD may be optimized to minimize bandwidth usage for objects beyond a certain distance necessary for the user's given application. In some embodiments, the control commands system may include automated detection and update of the codes to transmit to the server control command module. For example, the feedback control command may instruct the server to only include sending the lowest LOD of each object until the foveal area—or the z-positive culled datasets—of the user is filled. The feedback control may instruct the server to automatically adjust the LOD based on the given network conditions (e.g., available bandwidth).

In some embodiments, control command categories may be customized depending on the display system involved. For example, for display systems comprising one or more display units and behaving as a unified "screen", the display system may include different sets of the command codes or instructions. For such configuration of display, distance from the user to the display system may be a control command variable.

In other embodiments, display screen may not be limited to flat screens, but may involve other geometric shapes such as, for example, hallways, oval stadiums, discontinuous spaces where display screens may be distributed throughout the immersive environment but may not necessarily fill the immersive space.

Customized Control Command Settings

Figure 5:
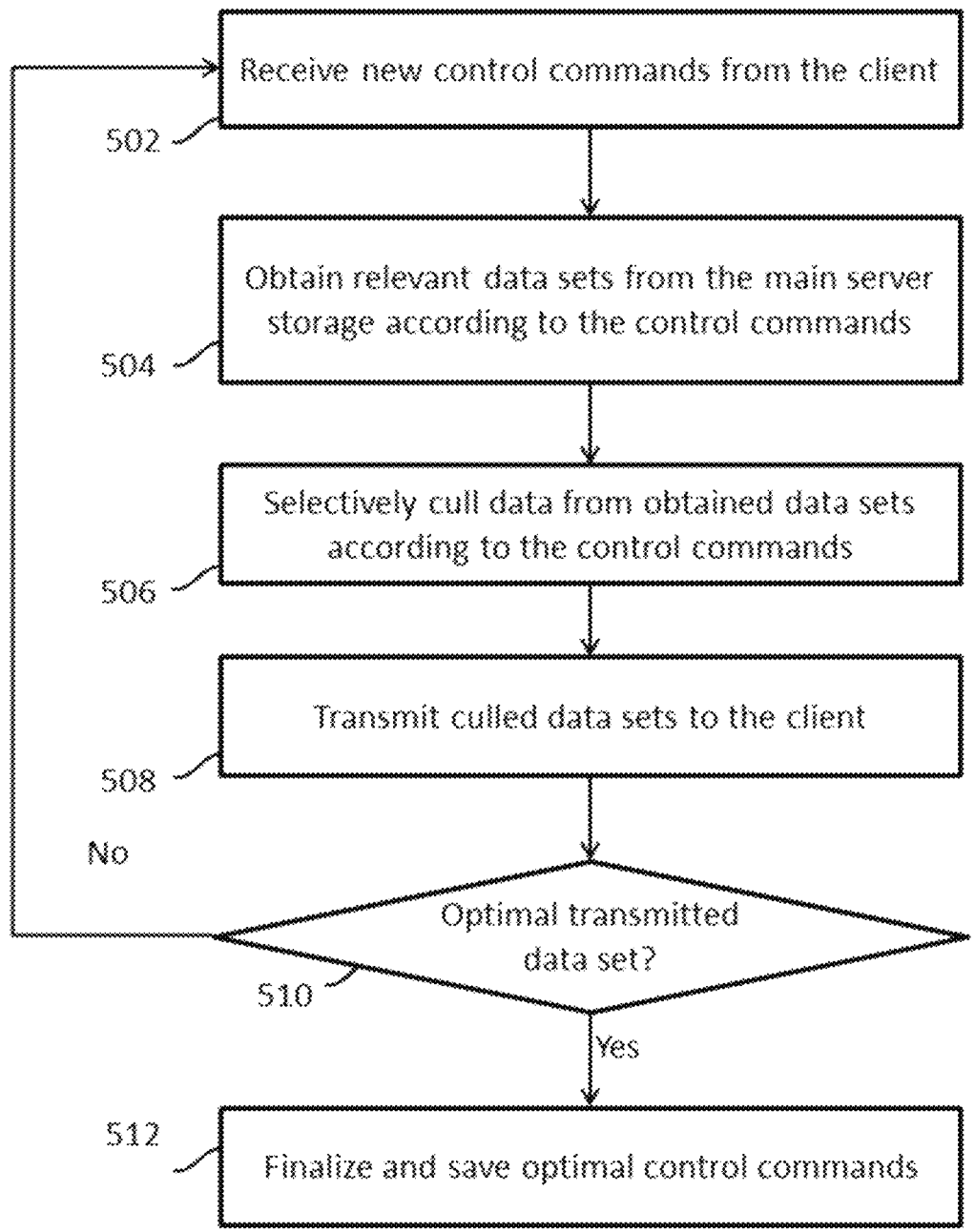
FIG. 5 shows an exemplary flow diagram of the selective culling feedback control system in accordance with some embodiments described herein.

FIG. 5 shows an exemplary flow diagram of the selective culling feedback control method in accordance with some embodiments described herein. The method begins when a control command—transmitted from a client (e.g., client terminal 145)—is received at a server (step 502). The control command may include one or more control variables, for example, the temporal, spatial, and related data selection methods for a user in an immersive VR environment. The control commands may be manual inputs selected by the user, or may be automatically updated or determined based on the sensed environment (e.g., perception environment 190).

Once the control commands are received, they may be parsed and applied to obtain relevant data sets; the control command may include data identifiers on the types of data sets that are highly relevant and are of interest to the user (e.g., user of the client terminal). For example, the control commands may instruct the server to pull audio inputs—as opposed to visual inputs—from the database storage (e.g., remote database 125), or textual or numeric data from any database or source.

Next, the server may be configured to selectively cull data from the obtained data sets. Selective culling may be performed according the received control commands (step 506). After the data sets are culled, they are transmitted to the client side (e.g., client terminal), via the communication network (step 508). The remote user may observe the transmitted data set, and depending on the received data set, the remote user-who may be in control of the client terminal may dynamically update the control command with a new set of codes or instructions. If, however, the received data set is satisfactory, the user may finalize the feedback control command codes (step 510). Once the feedback control command is finalized, the set of control command may be saved, either on the client or the server side (step 512). For example, the optimal control command for the given client-server setup may be saved at the client command module 250 or the server-side control command module 280. This may serve as a look-up table for various control commands that correlate to the system setup.

Select Applications of Selective Culling Control Methods

Figure 6A:
FIG. 6A-6B shows exemplary images of the selective culling feedback control system applied to images in accordance with an embodiment described herein.
Figure 6B:
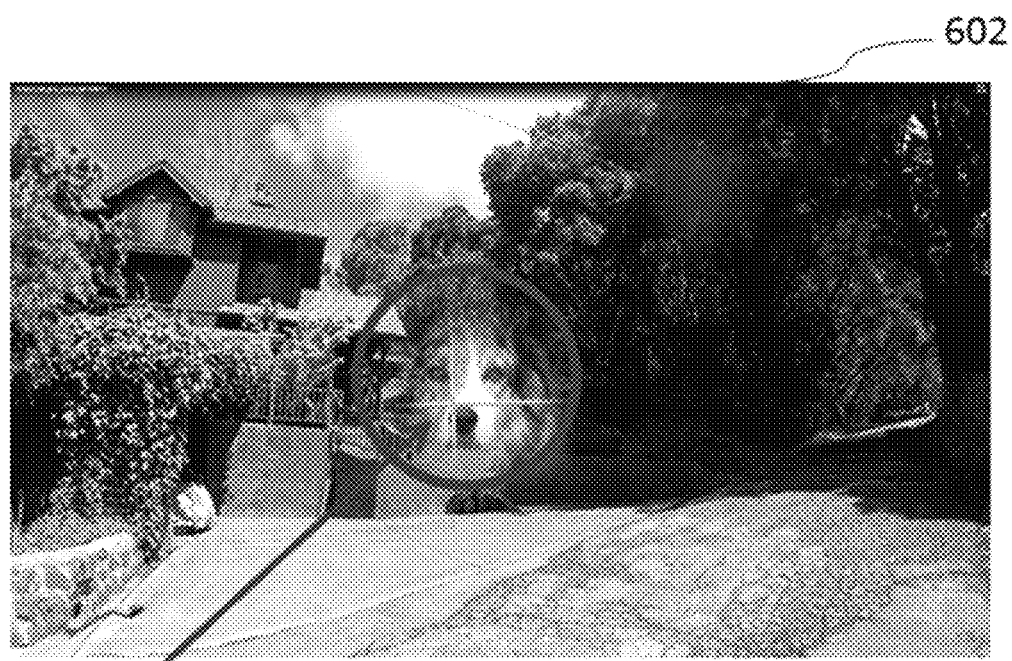

FIGS. 6A-6B show exemplary images of the selective culling control commands applied to images in accordance with an embodiment described herein.

The image in FIG. 6A illustrates an undersampled image 601, which means that the original image contains many more points of data per mapped pixel. For example, multiple pixels in the original image may be mapped to each pixel in the undersampled image. The undersampled image 601 may represent the image transmitted to the client side, whereas the original image may be located on the server side (e.g., server 120). The circle in the center of the image (605) may represent the field of interest (FOI). This may be defined by, for example, the focal viewpoint of the user, joystick, or other methods that enable the user to choose or select his or her FOI.

The image in FIG. 6B illustrates a post-processed image 602, in which the selective culling concepts described herein are applied. Once the FOI is defined by the user, the control commands may be updated to reflect the FOI, for example, by the user interacting with the client terminal 245. The control commands may be transmitted to the server side, for example, the server 120, and the FOI region for the original image may be magnified and superimposed onto the transmitted image such that one (1) pixel in the FOI region in original image may represent one (1) pixel in the transmitted/displayed image on the client side. Image 602 illustrates the modification, as can be seen by the enlarged image of the animal of interest 610 in the FOI.

Figure 7A:
FIG. 7A-7B shows exemplary images of the selective culling system applied to multiple data set types in accordance with an embodiment described herein.
Figure 7B:
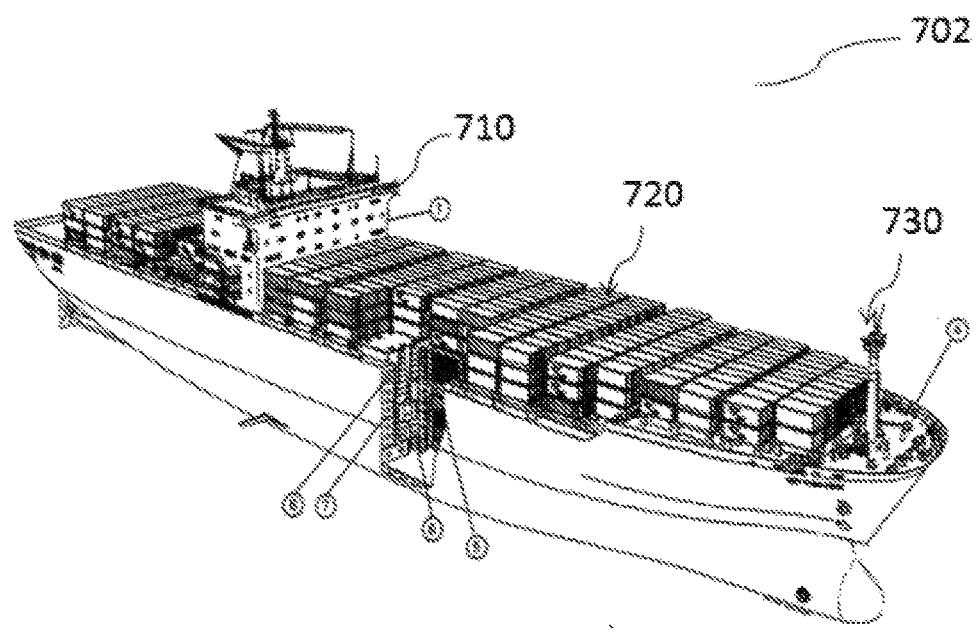

The images of FIGS. 6A-6B may also be exemplary images from a security/surveillance system. For such applications of the selective culling methods, the feedback control commands may include, but are not limited to, the following control categories and types:

User Controls (e.g., manual control device or touch screen with controls, gesture controls)
        Field of Interest, including the X, Y, and Z coordinates
        Temporal Information
        Playback location
        Playback speed
        Zoom of FOI on undersampled immersive video (e.g., FIG. 6B)
    Automatically updated feedback command values (e.g., values adjusted based on currently available network bandwidth)
        Priority data sets based on FOI
        Blurring of non-critical data sets FIGS. 7A-7B show exemplary images of the selective culling control commands applied to multiple types of data sets in accordance with an embodiment described herein. FIG. 7A may represent a container ship entering a harbor after, for example, an international voyage. The image 701 may be taken by a remote camera or an unmanned aerial vehicle (UAV). The UAV may be equipped with multiple sensor packages, and flying over the container ship. For example, the UAV sensors may include data sets of multiple different types of data inputs such as visual stereo, visual high resolution, radar, and radiological data. Other data sets that may be collected by the server may also include 3D geometry information, photogrammetry, and radar reflectance information with regard to container ships.

Since network bandwidth is limited, not all acquired data sets of the container ship in FIG. 7A may be transmitted across the network in a timely manner. One method of dealing with this issue may be to increase the compression rate of the incoming data streams and enable the client terminal (e.g., client terminal 245 in FIG. 2) to run various algorithms to optimize for the display. By applying selective culling control methods, for example, illustrated in FIG. 2, the control commands may determine which—among the multiple data sets of interest—data sets are the most valuable to the user for display.

In some embodiments, the remote database may also store data sets of all known container ships, and the UAV acquired image may be compared against the stored data to fingerprint (i.e., identify) the ship. FIG. 7B illustrates the selectively culled image, representing the important aspects of the ship, for the user in control of, for example, the client terminal and display system 245. Various aspects of the container ship 702, including the shape and placement of the bridge decks 710 and foremast 730 may indicate that the target ship is in fact the ship it claims to be. The layout of the containers 720 may also help detect the ship accurately. Since not all elements of the ship may be necessary for the identification of this particular container ship, the FOI may be defined to be the aspects described above 710, 720, and 730. The remaining visual images regarding the ship may not be of immediate interest, and may be selectively culled by the data processor on the server side. Other data sets described above may also be selectively culled to reflect their importance to the user, including the radio reflectance information or other sources.

Example Application #1: Selective Culling in Bandwidth-Limited Environments Optimizing for Perceived Quality in Smaller than Foveal Areas In some situations, a user may be located in a region or location where bandwidth or connectivity to the network is highly limited. For example, a user may be located in a middle of a desert with a smartphone. The smartphone's connectivity to the cellular network may be limited or spotty. In one scenario, the user's car may have broken down and the user may be attempting to connect to a remote expert. The remote expert may try to analyze any video feeds transmitted by the user, and provide diagnosis. The user may use the user's device to transmit any images or videos of the engine or any other components of the car that may require attention. The scenario presents a technical challenge described above, wherein the user device (i.e., a smartphone) captures more data than the bandwidth transmission allows.

The remote expert may attempt to view the video feeds transmitted by the user using his or her device (i.e., viewing device); both the capturing device (i.e., the user device) and the viewing device can be communicatively coupled to the selective culling platform. The viewing device may be configured to track the remote expert's focus of interest (FOI) locally. The FOI may be smaller than the viewer's foveal area. The bandwidth of the viewing device is also monitored locally.

Next, the viewing device may be configured such that information regarding the X, Y coordinates of the FOI and current bandwidth of the viewing device are both transmitted upstream to the selective culling platform or the user's capturing device. In some embodiments, the user's capturing device may include full functionality of the selective culling platform (i.e., selective culling platform 120 of FIG. 1). The user's capturing device may then use the FOI information to cull unnecessary parts of the image. The capturing device may automatically adjust the amount of culling based on the available bandwidth. In some embodiments, a percentage of available bandwidth can be reserved for fractional updates of the background, culled image. Other parameters may determine the FOI, including but not limited to, the amount of blending of the FOI with the background image, change in amount of zoom, framerates, and other parameters available to the remote expert.

Overall, in an environment where a real-time feed provided by a user's data capturing device (e.g., smartphone) exceeds available bandwidth, as long as the image at the source is culled properly by utilizing the selective culling algorithms described herein, a 1:1 pixel resolution can be provided automatically and/or manually in areas of interest by the remote expert.

Example Application #2: Optimizing Perceived Quality in Immersive Imagery

In some embodiments, individuals may desire to stream videos on large field of view (FOV) screens. For example, videos can be streamed by using cloud-based platforms such as Netflix, YouTube, or Amazon Video, and the like. Since viewers are using large FOV screens, the FOV in this case may be larger than the viewer's foveal area. In such cases, the selective culling platform can be configured to conserve bandwidth by culling the streamed videos. The viewer's focus of interest can be tracked locally by using one or more eye tracking devices. The viewer's received bandwidth can also be monitored locally.

Next, the viewer's FOI and the current bandwidth available to the viewer can be transmitted upstream to one or more streaming services, wherein the streaming services have installed or have applied the selective culling methods and systems describe herein. The selective culling platform can cull unnecessary parts of the image based on the FOI information of the user, and select the viewer's perceived quality (i.e., bandwidth to quality ratio) of streaming. The viewer may also provide the quality of image that he or she wishes to view, and the selective culling platform may adjust the amount or area of culling based on such information. In some embodiments, a percentage of the available bandwidth can be reserved for fractional updates of the background image, wherein the background image may refer to image that is selectively culled by the system.

Focus level or the amount of focus on the FOI can depend on, for example, varying radii of blending foreground with background image, quality of FOI compared to background image, size of the culled FOI, activity of tracked FOI over time, predictive moves of difference in iterations of FOI to maximize the viewer's experience at significantly lower bandwidth than required for updating all of each image at once, and lower than existing codecs.

Understanding various parameters, including, but not limited to display system specifications such as dot pitch, resolution of display, distance from viewer to display, or other parameters such as latency of control feedback loop can be examples of parameters which can help create satisfactory viewing experience for a target bandwidth set by streaming services or the viewers.

The higher the quality of the original source (e.g., feature film) and the higher the quality of the viewer's display device (e.g., super wide screen UHD television), the higher the bandwidth requirement to create an optimal viewing experience for the user, especially when this involves other conventional means (e.g., broadcast, multi-cast, or uni-cast). However, by utilizing real-time selective culling methods and systems described herein, the required bandwidth for a given level of perceived quality can remain functionally identical even with the exponential increase in source quality and display quality.

Example Application #3: Optimized Abilities of Remote Expert in Bandwidth Limited Situations In some situations, a viewer may be presented with a system of "infinite" resolution, such as a system with 360 degree view, stereo, "sufficient" frames per second (FPS), or with multiple modes of sensing and display. One goal of the selective culling platform can be to provide a remote expert with means of maintaining situational awareness, while culling views, viewpoints, modes, to be the most useful to the task at hand. A remote expert can generally refer to someone who is in possession of a knowledge or skill and is available remotely, accessible via one or more communication networks. The user's field of interest (FOI) can be captured via one or more features or modes, including, but not limited to, inputs that are passive to the user (e.g., retina/eye tracking, predictive movement of eye tracking over time: "passive mode"), inputs the user can manipulate actively (e.g., joystick, buttons, faders, etc: "active mode"), inputs that can be derived from other calculated FOI elements, analysis of various data sets (e.g., analysis of peak signal emission of RF from a complementary data set, or sound localization from audio telemetry), and the like.

The selective culling platform 120 can be configured to allow remote experts or other users of the system to select one or more different sets of inputs or modes. In some embodiments, the viewer can scroll through the multi-dimensional data sets in ways he or she chooses and finds useful. For example, a 360-degree camera operator may be able to capture or run through a hazardous area once, but may not be able to do so again. In such instances, a remote expert who is reviewing the 360-degree video can scroll through the time vector of what the 360-degree camera has already captured, and select the FOI at any point in time at full resolution, using available bandwidth. In other conventional methods, the real-time capture of the 360-degree videos can be transmitted in full, in real-time, but this will most likely be in lower resolution than useful or require the camera operator to be located at a hazardous area for longer than necessary periods, for example. The ability to scroll forward and back in time, can allow the full bandwidth to be focused on the FOI of the viewer, anywhere and at any time, at up to 1:1 for any and all of multiple data sets acquired.

Storing or transcribing data local to the capture source can be robust and cheap: SD memory, SSDs, or other forms of hard drives or disks can capture enormous amount of local data. The technical challenge is in transmitting such captured to a viewer or any remote expert, given the limitations of network capacity and bandwidth. By minimizing data going upstream and selecting frames or data to be transmitted based on FOV or FOI, the selective culling platform can maximize the viewing quality for any given bandwidth.

Example Application #4: Improving Bandwidth Utilization or Usage in Rendered Viewing In some embodiments, a viewer may desire to view visualization of complex geometry or other similar data sets. For example, a user may be viewing images or maps in aerial or birds-eye view. The data sets involved in such use cases may include, but not limited to, XYZ vertices, polys, mapping, shading, and the like.

Given parameters sufficient—localization of viewpoint and FOI—for creating a virtual reality (VR) view of any given data sets, the selective culling platform and methods described herein can help render a FOV sufficient for the resolution of the display device. If real-time rendering of the FOV requires data throughput larger than available bandwidth, the system can be configured to cull the images based on bandwidth availability. Compared to full foveation, culling methods described herein can provide technical benefits of using less CPU cycles for similar viewing experiences.

The selective culling platform 120 may also help cull geometric objects by level of detail (LOD), proximity to the user, importance based on given task, predicted direction of travel (by known path of travel—of the user's eye movement, head movement—when there exists a known game story line or by prediction of target by user's travel/movement vector over a given time period, etc.).

Additionally, FOI can be enhanced (e.g., higher resolution at the FOI), maintained, and improved, by filling objects, geometry, mapping, etc., at the user's FOI first, and iterate details along the radius away from the center of the user's FOI. For example, the closer to the FOI the more detail can be shown, and vice versa. Additionally or alternatively, low LOD objects may be cached and priority can be assigned to low LOD objects that fulfill the design needs of a scene, while preserving bandwidth for critical objects in the FOI.

Example Application #5: Real-Time Culling in Augmented Reality (AR) Environments In some instances, a user may be immersed in an AR environment, at a certain location. The location of the user may be tracked or obtained by utilizing the global positioning system (GPS) (e.g., using the GPS data of the user's device), and the FOI can be tracked via retinal/HMD sensing. Based on the location of the user, the selective culling platform can be configured to communicate with an "objects" database to obtain objects by position/location. For example, the user may be traversing inside a store, wherein the store may have systems communicatively coupled to the "objects" database. The selective culling platform can be configured to pull data relevant and customized for the user from such objects databases, while maximizing the efficiency of bandwidth usage for any given task.

In some embodiments, bandwidth can be prioritized based on, for example, personal information of the user (e.g., wealth, health, etc.), proximity to the user (or user's predicted path), value to the user or the perceived value to the data provider (e.g., advertising platforms), immediacy of value to each user, and the like.

Example Application #6: Creating a Foveated Area for FOI and Blending it with the Rest of the Picture/Image For a visible area extending beyond the human user's foveal area, it is useful to cull the depth and detail of that data to best suit the user's need and FOI. The foveal area can vary with the distance to the screen, and thus such area cannot necessarily be representable by pixel count or display DPI, but can be treated more like a dynamically calculated parameter. In the real world, the ideal case is to foveate exactly to human visual limits, which can be equivalent to having the foveal area match the human eye, wherein the falloff and periphery of the foveal area can match those of the human eye (and brain).

In some instances, data may be constrained due to one or more of the following: bandwidth limitations (e.g., network connection) or processing power (e.g., GPU speed), or lack of available resolution in the viewing device itself (e.g., VGA displaying 4 k source). In other cases, it may be desirable to constrain the data, under one or more of the following conditions: resolution may exceed human perception limitations (e.g., Giga-pixel imagery at better than retinal resolution), FOI may be tighter or more focused than default display method (e.g., binoculars), or retention of situational awareness may require under-sampling of data (e.g., value of a panorama view compared to binoculars when watching for motion over a wide area; this can be highly purpose dependent), and the like.

In some embodiments, the following steps can be implemented and performed by the selective culling platform for video or image data: first, the user's visual FOI can be tracked locally (i.e., local as in where the user is located). The FOI can be tracked by monitoring the 2 dimensional coordinates (e.g., X, Y coordinates) of a particular region of the video or image. The X, Y coordinates can be monitored, for example, i) by eyeball, retina, head, body position movements; ii) common machine controls like joystick, mouse, pointing devices; iii) by first order parameters in a given frame such as, brightest (luma channel (Y)), most colorful (chroma channel (C)), or specific values of Y and C, motion of $1^{st}$ order parameters over time, external sources (e.g., objects tracked using radar within FOV), and the like.

The steps for tracking the X and Y coordinates can be iterated and/or repeated over time. Vector of (X,Y) can show "intentionality" of the user (or the video/image). For example, rapidly shifting movements may require compensation of the culled foreground area (e.g., due to available bandwidth, surfeit of data, best practices for situational awareness). Intentionality can also be indicated by FOI on machine designated objects (e.g., user can be looking at the brightest object on screen). In some instances, if the 2-dimensional vector of (X, Y) is inconsistent within localized time slices, and the summed vector of (X, Y) is inconsistent within most recent time slices (e.g., for example, when "current frame" and the "previous frame" don't point within some threshold of similarity when compared to the summed value of the past second's worth of tracking), then the selective culling platform can be configured to rescale the foveated area.

In some embodiments, size and detail of foreground can vary with regard to, one or more of the following factors, but not limited to: i) consistency in user's (X,Y) vector and ii) available bandwidth. The foreground size and detail can be directly related to available bandwidth. Technical advantages of committing to a specific bandwidth—especially when less than the total available or aggregate bandwidth—can include, but not limited to, 1) allowing multiple alternative data sources (e.g., non-visual (radar)); 2) maintaining user's consistent expectations in viewing since quality change in video can be a distraction); and 3) predictable cost of data rate for content providers, for example.

In some embodiments, the rate of sampling (X,Y) can also be configurable by the selective culling platform. Nyquist limit errors in tracking eye movement can be frustrating to the user; and oversampling FOI and correcting at the maximum sample rate may also create frustrating artifacts in the edge of foreground areas. For example, jitter and attention gaps can create positive feedback loops in which the user's attention may be pulled to the edges of the foreground in all directions as artifacts occur. Consequently, it can be beneficial to maintain smoothness or continuity of tracked movements. For example, if the movement vectors fit a specific curve, the system can be configured to predict and process ahead of the actual movement along the curve; and if the vector calculations indicate deceleration, then the system can be configured to adjust the FOI accordingly. In some embodiments, the system can be configured to predict end points and reduce the size of the FOI if it is currently under-sampling that specific area, and avoid hysteresis at end points.

In some embodiments, the selective culling platform can be configured to track each eye separately. This can be advantageous for various reasons: for example, another value (Z-value) can be tracked as a difference of $(X,Y)_{left}$ $(X,Y)_{right}$; the comparison of the parallax of left and right can indicate FOI specificity, and enable one or more of the following techniques for improving user experience: zooming into the specific area; reducing foreground area for better image quality; increasing framerate of foreground; or spending more data on chroma saturation. For example, where component visual vectors have been used, deprecating the chroma can reduce the required data rate (e.g., [Y, (R−Y, B−Y)/2]) for a user showing consistent vector of movement; and consistent parallax of FOI could be given better quality component video (e.g., [Y, R−Y, B−Y]) over a smaller foreground area because the system can detect that the FOI is on a specific object.

In addition, lack of parallax can indicate that the user is scanning an area. For example, if $(X,Y)_{left}$ $(X,Y)_{right}$ show lack of coherence at screen distance, it can indicate that the user has relaxed. In some instances, this may indicate that increased foreground area may be preferred (e.g., subsample within foreground for larger foreground area); alternatively, it can indicate that a large movement in FOI is upcoming (e.g., increase foreground area size in expectation of sudden unpredictable FOI change).

As a next step, once the user's FOI is tracked locally, the FOI information can be transmitted, along with other useful or relevant data, to the remote server (e.g., selective culling platform 120) where the data required may be available for manipulation at the granularity required. The required granularity can be dependent on various aforementioned factors, including bandwidth, display settings, distance to screen, and others.

Next, the FOI can be used to choose a foreground to be displayed. The size of the foreground can be affected by: i) available data rate; ii) foveation; iii) vector and predicted vector of user's intended FOI; and iv) importance of the background, and the like.

Foveation can depend on one or more of the following, including but not limited to: distance to display; pixel DPI; and [pixels available in source material] divided by [pixels available in display]. Alternatively, when the user's foveal acuity exceeds display detail, foreground can be zoomed to 1:1 with no loss of detail for human perception. When available source material exceeds the level of detail representable by the display system, entire image size can be increased to 1:1 without degradation (this may be invoked automatically by watching the user's FOI). For example, a stable or persistent FOI may indicate the intent to see more (data, depth, frame rate, overlaid data sets, etc).

Next, the foreground can be sent via one or more choices of codec (e.g., RLE, component video PCM, or h.264, and the like) using one or more transmission methods (e.g., RTSP, TCP/IP, NTSC, serial, and the like) to the user's computer.

Next, the user's computer process can determine how to blend and/or stitch together the foreground information with the background, as well as with any other complementary data sets that may or should be overlaid upon the same space. In some embodiments, the foreground may be composited with textual information on what the user's FOI is predicted to be. The foreground may also be composited with or from any of many EO/IR sensor packages: Viz, UV/IR, FLIR, Radar, and the like. The foreground may also be composited with Augmented Reality (AR) elements.

FOI data transmitted upstream from the user's computer (e.g., user device 145) can be less than 1, 2, 3, 4, 5, 6, 7, 8, 9, 10, 20, 30, 40, 50, 60, 70, 80, 90, 100, 150, 200, 250, 300, 400, 500 bytes per frame, at any configurable frame rate. The number of bytes can be configurable and may be less or more than the aforementioned values. Even minimal amounts of user intentionality can create waterfalls of usefully culled data: differing FOIs can provide triangulation and confirmation. Examples include, but not limited to, i) two orthogonal FOIs creating an XYZ location; ii) two or more FOIs separated significantly from each other increasing confidence in localization of the object of interest; iii) two or more FOIs of different types localizing the same area can increase target confidence.

Methods and systems of the present disclosure can be implemented by way of one or more algorithms. An algorithm can be implemented by way of software upon execution by a central processing unit, for example, the CPU 160 or server processors or any other computer systems described herein. For example, some embodiments use the algorithms illustrated in FIGS. 3-4 or other algorithms provided in the associated descriptions.

As used herein, "or" is inclusive and not exclusive, unless expressly indicated otherwise by context. Therefore, "A or B" means "A, B, or both," unless expressly indicated otherwise or indicated otherwise by context. Moreover, "and" is both joint and several, unless expressly indicated otherwise or indicated otherwise by context.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for selectively culling data sets at a data source for a viewer of a display system, comprising:
    (a) determining a control command based at least on a plurality of requested data sets, field of interest of the viewer, and available bandwidth, wherein the field of interest of the viewer is based on a foveal area of the viewer with respect to the display system;
    (b) receiving, at a server, the control command, wherein the control command comprises encoding of instructions on which one or more subsets among the plurality of requested data sets are to be culled to be within constraints of the available bandwidth;
    (c) selectively culling, at the server, the one or more subsets among the plurality of requested data sets according to the transmitted control command;
    (d) presenting at least partially within the foveal area of the viewer, on the display system, the selectively culled one or more subsets rather than the plurality of requested data sets, for selective viewing by the viewer; and
    (e) updating the control command based on user instructions received from the viewer, wherein the user instructions (i) are based on the selectively culled one or more subsets presented on the display system in (d) and (ii) comprise instructions for updating the field of interest of the viewer in the control command.

2. The method of claim 1, wherein the data sets comprise video and audio content.

3. The method of claim 2, wherein the data sets further comprise sensor data.

4. The method of claim 1, wherein the control command is further based at least on display system information, wherein the display system information includes display type, display resolution, display size, display frame rate, and distance from the viewer to the display system.

5. The method of claim 4, wherein the control command is further based at least on metatags and metadata embedded or associated with the plurality of requested data sets.

6. The method of claim 4, wherein the size of the control command is 128 bytes or less.

7. The method of claim 2, wherein the video and audio content comprises two-dimensional, three-dimensional, or virtual reality video and audio content.

8. The method of claim 7, wherein the control command information is further based at least on foveal area target shape.

9. The method of claim 1, wherein the display system is a head-mounted display (HMD) system.

10. The method of claim 9, wherein the field of interest of the viewer is obtained by monitoring one or more sensors local to the viewer.

11. The method of claim 10, wherein the field of interest of the viewer is further adjusted based on user input methods, wherein the user input methods comprise joystick, touch display, and keyboard.

12. The method of claim 10, wherein the field of interest of the viewer is further adjusted based on one or more input methods selected from the group consisting of: knobs, fader, and buttons.

13. The method of claim 10, wherein the one or more sensors are configured to track body movement, head movement, and eye movement of the viewer.

14. The method of claim 10, wherein the one or more sensors are further configured to track stereo view information for each eye of the viewer.

15. The method of claim 13, wherein the X, Y, and Z coordinate information of the eye, head, and body movements are tracked.

16. The method of claim 15, wherein the one or more sensors are configured to track the movements over time, thereby calculating acceleration and interpolation of the field of interest.

17. The method of claim 13, wherein the one or more subsets are within the field of interest of the viewer.

18. The method of claim 17, wherein the amount of culling is configured to be proportional to the available bandwidth or desired bandwidth between the server and the display system.

19. A system for selectively culling data sets at a data source for a viewer of immersive display systems, comprising:
(a) an immersive display system comprising sensor modules;
(b) a processor that is communicatively coupled to a server system and adapted to execute stored instructions; and
(c) a memory device, communicatively coupled to the processor, wherein the memory device is configured to:
determine a control command based at least on a plurality of requested data sets, field of interest of the viewer, and available bandwidth, wherein the field of interest of the viewer is based on a foveal area of the viewer with respect to the display system;
receive, at the server system, the control command, wherein the control command comprises encoding of instructions on which one or more subsets among the plurality of requested data sets are to be culled to be within constraints of the available bandwidth;
selectively cull, at the server system, the one or more subsets among the plurality of requested data sets according to the transmitted control command;
present at least partially within the foveal area of the viewer, on the display system, the selectively culled one or more subsets rather than the plurality of requested data sets, for selective viewing by the viewer, and
update the control command based on user instructions received from the viewer, wherein the user instructions (i) are based on the selectively culled one or more subsets presented on the display system and (ii) comprise instructions for updating the field of interest of the viewer in the control command.

20. The system of claim 19, wherein the control command is further based at least on the immersive display system information, wherein the immersive display system information includes display type, display resolution, display size, display frame rate, and distance from the viewer to the display system.

21. The system of claim 19, wherein the data sets comprise video and audio content.

22. The system of claim 19, wherein the field of interest of the viewer is determined based at least on data obtained by the sensor modules.

23. The system of claim 22, wherein the sensor modules are configured to track body movement, head movement, or eye movement of the viewer.

24. The system of claim 23, wherein the sensor modules are further configured to track stereo view information for each eye of the viewer.

25. The system of claim 23, wherein the immersive display system is a head-mounted display (HMD).

26. The system of claim 19, wherein the amount of culling is configured to be proportional to the available bandwidth or desired bandwidth between the server system and the immersive display system.

* * * * *